US010250682B2

(12) United States Patent
Haugseth et al.

(10) Patent No.: US 10,250,682 B2
(45) Date of Patent: Apr. 2, 2019

(54) METHOD OF STORING DATA

(71) Applicant: AKER SUBSEA LIMITED, Maidenhead, Berkshire (GB)

(72) Inventors: Erik Haugseth, Maidenhead (GB); Harald Nordgard-Hansen, Maidenhead (GB)

(73) Assignee: AKER SOLUTIONS LIMITED, London (GB)

(*) Notice: Subject to any disclaimer, the term of this patent is extended or adjusted under 35 U.S.C. 154(b) by 359 days.

(21) Appl. No.: 14/876,329

(22) Filed: Oct. 6, 2015

(65) Prior Publication Data

US 2016/0100012 A1    Apr. 7, 2016

(30) Foreign Application Priority Data

Oct. 7, 2014   (GB) .................................. 1417754.7

(51) Int. Cl.
*H04L 29/08* (2006.01)
*E21B 41/00* (2006.01)

(52) U.S. Cl.
CPC ...... *H04L 67/1097* (2013.01); *E21B 41/0007* (2013.01); *H04L 67/1095* (2013.01)

(58) Field of Classification Search
None
See application file for complete search history.

(56) References Cited

U.S. PATENT DOCUMENTS

| 6,422,315 B1* | 7/2002 | Dean ................... E21B 33/0355 166/339 |
| 2004/0262008 A1* | 12/2004 | Deans ................. E21B 41/0007 166/339 |
| 2008/0193284 A1 | 8/2008 | Hoeffken |
| 2010/0008371 A1 | 1/2010 | Brekke et al. |
| 2013/0307699 A1 | 11/2013 | Brekke et al. |

FOREIGN PATENT DOCUMENTS

| EP | 2 392 769 | | 12/2011 | |
| EP | 2811350 A1 | * | 12/2014 | ........... H04L 12/403 |
| GB | 2477714 | | 8/2011 | |
| WO | WO 2008/020152 | | 2/2008 | |

OTHER PUBLICATIONS

Search Report for GB 1417754.7, dated Mar. 13, 2015, 8 pages.
IWIS Panel Industry Standards Chapter 6, IWIS-RP-A2, Apr. 2011, 35 pages.

* cited by examiner

*Primary Examiner* — Jeffrey R Swearingen
(74) *Attorney, Agent, or Firm* — Nixon & Vanderhye P.C.

(57) ABSTRACT

A method of sharing data in a subsea network includes a plurality of nodes interconnected by a plurality of data connections arranged to carry data to and from equipment in subsea installations, the method includes: storing data in a mass subsea data store provided across one or more nodes in the subsea network configured to act as a subsea data server; and on receiving, at the subsea data server, a request for access to data stored in the mass subsea data store, the subsea data server retrieving the requested data from the data store and causing the requested data to be sent over the subsea.

10 Claims, 3 Drawing Sheets

METHOD OF STORING DATA

This application claims priority to GB Patent Application No. 1417754.7 filed 7 Oct. 2014, the entire content of which is hereby incorporated by reference.

FIELD OF THE TECHNOLOGY

The present invention relates generally to subsea electronics modules ("SEMs") for providing a subsea data sharing network.

BACKGROUND

Global energy demand is increasing, which is putting pressure on the oil and gas industry to improve the effectiveness of extraction from mature fields and to explore fields that are smaller and located in more challenging environments, including ultra-deepwater environments. The development of subsea oil and gas fields requires specialised equipment that must be robust and reliable to safeguard both the equipment itself and the environment and to make the exploitation of the subsea hydrocarbons economically feasible. The deployment and repair of subsea equipment requires specialised vessels equipped with diving and robotic equipment and so interventions to replace or repair such equipment is generally very expensive.

To monitor the extraction of product from subsea wells, the environmental conditions therein are monitored by pressure and/or temperature sensors located downhole at the base of the wellbore. In addition, wellhead and wellbore equipment to control the flow of product is electronically controlled by command signals from the wellhead.

The data transfer requirements between the top side and subsea equipment in order to control the subsea equipment and retrieve data collected by the subsea equipment can be very high. For example, in order to control the subsea well equipment, currently, data retrieved from the subsea equipment is sent top side were the control systems and logic solving systems are based. Once this data has been processed by the control and logic solving systems, control signals are then sent back subsea to control the equipment at a wellhead.

A single umbilical is usually required to carry data and control signals from subsea to topside and vice versa for a number of well assemblies. Usually, the subsea network connecting the umbilical to the equipment at various locations subsea comprises a number of point-to-point data connection cables such that a subsea network having a star-like topology is used to route the control signals received on the umbilical to the subsea locations.

As a result, the data transfer requirements for umbilical can become very high. Even though new umbilical deployments often include the installation of fibre-optic links between the subsea and topside level, giving more bandwidth, this is still the most costly place to transfer data as the operational bandwidth required to monitor and control the well assemblies can consume a significant proportion of the channel capacity of the umbilical. The channel capacity of the umbilical is often constrained due to the long distances over which data can be transferred, the level of redundancy and high requirement for error correction. With an increasing volume of data being generated both topside and subsea, the operational demands on umbilicals are increasing such that there is little spare capacity in the umbilical to handle non-operation critical, lower priority data transfers.

For example, it is often required to transfer data from a surface facility ("top side") to subsea to update well equipment, either downhole or at the wellhead, with often large files of new software, configurations datasets, etc. Currently, in order to update equipment, this data is routed from topside to subsea in a point-to-point data transfer using whatever low priority bandwidth is free on the umbilical. File transfer support from topside to the wellhead and well assembly equipment is often not robust and so these transfers can be problematic. In addition, as each equipment requires updating individually, the time required to transfer software updates for larger numbers of identical equipment can often be a number of days. Alternatively, the operations-critical data may be interrupted to allow software data transfers to take priority. However, this is undesirable and disruptive.

As a result, transferring large amounts of non-time critical and non-operation critical data subsea using an umbilical can be a very long, problematic and difficult process such that it is impractical and costly to transmit a large volume of software updates and configuration dataset updates subsea by the umbilical.

Similarly, the volume of data collected by well sensors and instruments subsea is ever increasing. This logging and monitoring data, while potentially very useful for well analysis and control, is often not capable of being transmitted topside due to the bandwidth limitations on the umbilical and so a large amount is typically discarded.

The electronics for interfacing with the subsea equipment to process the received sensor signals and to provide the control signals to the well equipment are generally provided within a subsea electronic module (SEM) that is disposed within a subsea control module (SCM) provided at the wellhead. These SEMs form nodes in the subsea network for routing data to and from topside via the umbilical.

The SEM generally provides a plurality of physical cards that support electronic assemblies (such as printed circuit boards, PCBs) arranged in slots connected by a backplane all contained within a robust housing that can withstand the extreme high pressure environment at the subsea wellhead. The electronic assemblies of the cards each perform different electronic functions for interfacing with different well equipment from different manufacturers. In the new generation of SEMs, there is now a quite tight coupling between the various cards in a SEM mode, sharing common parts of their software images, having a single configuration database (CDB) for the node and so forth. However, the SEM nodes currently are quite separate from each other in their functionality in the network other than to route data in the network to and from the umbilical.

European patent application publication number EP2458140 discloses providing a data store at an SCM for data monitoring the condition of the subsea equipment. The data store allows for storage and sending of the condition monitoring data up the umbilical separate from client-sensitive data.

It is in this context that the present invention is devised.

SUMMARY OF THE INVENTION

The present invention relates to subsea electronics modules which have increased storage memory capacity and which, via subsea links, form an ad hoc network for sharing data stored thereon.

Viewed from one aspect, the present invention provides a method of sharing data in a subsea network comprising a plurality of nodes interconnected by a plurality of data connections arranged to carry data to and from equipment in subsea installations, the method comprising: storing data in a mass subsea data store provided across one or more nodes in the subsea network configured to act as a subsea data server; and on receiving, at the subsea data server, a request for access to data stored in the mass subsea data store, the subsea data server retrieving the requested data from the data store and causing the requested data to be sent over the subsea network to the intended recipient.

In embodiments, the one or more nodes in the subsea network providing the mass subsea data store are subsea electronics modules for use in a subsea installation.

In embodiments, the mass subsea data store is a distributed data store across mass storage provided by plural co-operating subsea electronics modules.

In embodiments, data in the mass subsea data store is stored in a replicated fashion across more than one of the subsea electronics modules.

In embodiments, the nodes in the network providing the mass subsea data store are connected as peer nodes in a mesh network.

In embodiments, he nodes configured to act as the subsea data server are configured to handle and serve requests in accordance with the hypertext transfer protocol.

In embodiments, the method further comprises receiving data from top side via a data connection carried by an umbilical cable or a data transfer subsea from a mass storage device of a remotely operated vehicle (ROV) and storing it in the mass subsea data store.

In embodiments, the method further comprises making data received via the umbilical and stored in the mass subsea data store available to other nodes in the network and network accessible subsea equipment, and serving requests at the subsea data server therefrom for access to the stored data received via the umbilical.

In embodiments, the method further comprises: storing, at the mass subsea data store, data generated by subsea equipment; and transferring at least some of the data generated by the subsea equipment stored in the mass subsea data store top side by one or both of: sending the data over the umbilical as low-priority network traffic using available umbilical bandwidth; performing a bulk data transfer by moving a mass storage device containing the data from subsea to top side.

In embodiments, performing a bulk data transfer by moving a mass storage device containing the data from subsea to top side comprises: transferring the data subsea to a mass storage device on a remotely operated vehicle (ROV); and bringing the data top side using the remotely operated vehicle.

In embodiments, transferring the data subsea to a mass storage device on a remotely operated vehicle (ROV) comprises one or more of: using a wet mateable connector to provide a wired connection between the subsea network and the mass storage device on a remotely operated vehicle (ROV); wirelessly communicating the data between the subsea network and the ROV using a wireless networking protocol; using free space optical communication; using an acoustic link.

In embodiments, performing a bulk data transfer by moving a mass storage device containing the data from subsea to top side comprises: transferring the data subsea to a mass storage device arranged in a buoyant housing; releasing the buoyant housing and allowing the mass storage device to float top side.

Viewed from another aspect, the present invention provides a subsea data sharing system comprising: a subsea network comprising a plurality of nodes interconnected by a plurality of data connections arranged to carry data to and from equipment in subsea installations; wherein one node of the subsea network is configured to provide, or wherein more than one of the nodes of the subsea network are configured to provide together a mass subsea data store for storing data in mass storage provided at the or each node; and wherein the node or nodes are further configured to act as a subsea data server that, on receiving a request for access to data stored in the mass subsea data store, retrieve the requested data from the data store and cause the requested data to be sent over the subsea network to the intended recipient.

In embodiments, the request is received from, and the served data sent to, a subsea equipment in the subsea network or a top side network node.

In embodiments, the one or more nodes in the subsea network providing the mass subsea data store are subsea electronics modules for use in a subsea installation.

In embodiments, the mass subsea data store is a distributed data store across mass storage provided by plural co-operating subsea electronics modules.

In embodiments, data in the mass subsea data store is stored in a replicated fashion across more than one of the subsea electronics modules.

In embodiments, the subsea electronics modules comprise: a mass storage module; a data processing module; and memory comprising instructions which, when carried out by the data processing module, cause the subsea electronics modules to be configured to operate, in use, in accordance with any of the embodiments of the methods of the invention described herein.

In embodiments, the nodes in the network providing the mass subsea data store are connected as peer nodes in a mesh network.

In embodiments, the nodes configured to act as the subsea data server are configured to handle and serve requests in accordance with the hypertext transfer protocol.

In embodiments, the or each node is configured, in response to receiving data from top side via a data connection carried by an umbilical cable or a data transfer subsea from a mass storage device of a remotely operated vehicle (ROV), to store said data in the mass subsea data store.

In embodiments, the or each node is further configured to make data received via the umbilical and stored in the mass subsea data store available to other nodes in the network and network accessible subsea equipment, and to serve requests at the subsea data server therefrom for access to the stored data received via the umbilical.

In embodiments, the or each node is configured: to store, at the mass subsea data store, data generated by subsea equipment; and to transfer at least some of the data generated by the subsea equipment stored in the mass subsea data store top side by the nodes being configured to: send the data over the umbilical as low-priority network traffic using available umbilical bandwidth; and/or perform a bulk data transfer by moving a mass storage device containing the data from subsea to top side.

In embodiments, the or each node is configured to perform a bulk data transfer by moving a mass storage device containing the data from subsea to top side by the or each node being further configured to: transfer the data subsea to a mass storage device on a remotely operated vehicle (ROV) that subsequently brings the data top side.

In embodiments, the or each node is configured to transfer the data subsea to a mass storage device on a remotely operated vehicle (ROV) by one or more of: using a wet mateable connector to provide a wired connection between the subsea network and the mass storage device on a remotely operated vehicle (ROV); wirelessly communicating the data between the subsea network and the ROV using a wireless networking protocol; using free space optical communication; using an acoustic link.

In embodiments, the or each node is configured to perform a bulk data transfer by moving a mass storage device containing the data from subsea to top side by the or each node being further configured to: transfer the data subsea to a mass storage device arranged in a buoyant housing; release the buoyant housing and allow the mass storage device to float top side.

In embodiments, one or more of the nodes is provided with a periodically dispensable plurality of said mass storage devices each arranged in a buoyant housing for receiving data to be transferred top side from said mass subsea data store and for being released and floating top side.

In embodiments, each of the plurality of said mass storage devices arranged in a buoyant housing further comprises a tracking device for locating the dispensed mass storage after flotation top side.

Viewed from another aspect, the present invention provides a subsea electronics module for use in a subsea data sharing system of any of the embodiments described herein, comprising: a mass storage module; a data processing module; and memory comprising instructions which, when carried out by the data processing module, cause the subsea electronics module to be configured to operate, in use individually or together with other like subsea electronics modules, in accordance with the method of any of the embodiments described herein to provide a mass subsea data store and to act as a subsea data server.

In embodiments, the mass data storage has a capacity greater than that needed for the subsea electronics module to perform the operational requirements of the subsea electronics module.

Viewed from another aspect, the present invention provides a computer readable medium, preferably non-transitory, carrying instructions for configuring a subsea electronics module for use in a subsea data sharing system as of any of the embodiments described herein and having a mass storage module and a data processing module, when the instructions are carried out by the data processing module, to operate the subsea electronics module in use individually or together with other like subsea electronics modules, in accordance with the method of the embodiments described herein to provide a mass subsea data store and to act as a subsea data server.

Viewed from another aspect, the present invention provides a method of operating a remotely operated vehicle (ROV) to retrieve data from a subsea data store, comprising: operating an ROV to interface subsea with a subsea data store of any of the embodiments described herein; receiving data therefrom via a data connection with a node of the subsea network; storing said received data in a mass storage device on the remotely operated vehicle (ROV); and bringing the data top side using the remotely operated vehicle.

In embodiments, receiving the data from the subsea data store comprises one or more of: using a wet mateable connector to provide a wired connection between the subsea network and the mass storage device on a remotely operated vehicle (ROV); wirelessly communicating the data between the subsea network and the ROV using a wireless networking protocol; using free space optical communication; using an acoustic link.

Viewed from another aspect, the present invention provides a method of transferring data from a subsea data store top side using buoyant devices, comprising: transferring data stored in a subsea data sharing system of any of the embodiments described herein to a mass storage device provided subsea arranged in a buoyant housing; and releasing the buoyant housing and allowing the mass storage device to float top side.

In embodiments, the method further comprises periodically transferring data subsea to one of a dispensable plurality of said mass storage devices each arranged in a buoyant housing for receiving data to be transferred top side from said mass subsea data store and for being released and floating top side.

In embodiments, each of the plurality of said mass storage devices arranged in a buoyant housing further comprises a tracking device for locating the dispensed mass storage after flotation top side.

In embodiments, the method further comprises tracking and collecting a buoyant mass storage device that has been dispensed and has floated to the surface; and retrieving the data stored thereon top side.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one aspect or embodiment of the invention are applicable to all aspects or embodiments, unless such features are incompatible.

BRIEF DESCRIPTION OF THE DRAWINGS

Aspects of the invention may best be understood by reference to the following description of certain exemplary embodiments together with the accompanying drawings in which.

DETAILED DESCRIPTION OF PREFERRED EMBODIMENTS

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. Furthermore, terms "comprises," "comprising," or any other variation thereof, are intended to cover a non-exclusive inclusion, such that apparatuses and method steps that comprises a list of elements or steps does not include only those elements but may include other elements or steps not expressly listed or inherent. An element or step proceeded by "comprises . . . a"

does not, without more constraints, preclude the existence of additional identical elements or steps that comprises the element or step.

Figure 1:
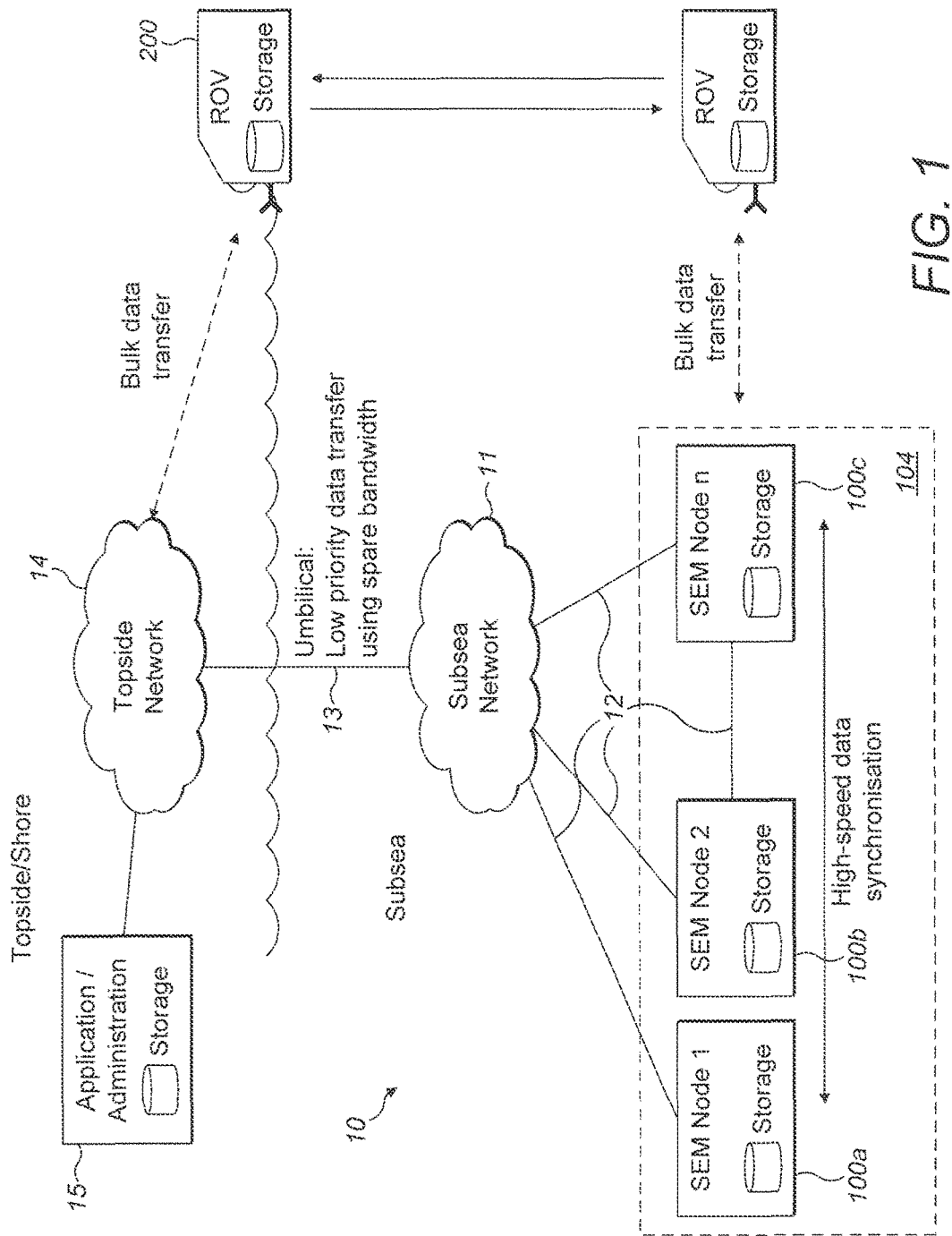
FIG. 1 shows a system for sharing data subsea in accordance with an embodiment of the invention.

Reference will now to FIG. 1, which shows a system 10 for sharing data subsea in accordance with an embodiment of the invention. The system 10 includes a subsea network 11 comprising a plurality of nodes 100 interconnected by a plurality of relatively high channel capacity wired data connections 12 arranged to carry data to and from equipment in subsea installations (not shown). More than one of the nodes 100 but not necessarily all nodes of the subsea network 11 are configured to provide together a mass subsea data store 104 for storing data in mass storage provided at the or each node 100. In alternative embodiments, however, only a single node 100 of the network may be configured to solely provide a mass subsea data store for storing data in mass storage provided at that node.

In the embodiment, nodes 100a, 100b and 100c provided by subsea electronics modules provide the mass subsea data store. However, other equipment providing nodes in the subsea network 11 may be configured to provide individually, or together with other nodes, the mass subsea data store 104.

The wired data connections 12 are formed across the physical network infrastructure based on the network topology, which may be a star network centered on the node connected directly to the umbilical. However, currently, in the field, it is common for additional direct data connections 12 to be added between the nodes of the subsea network including the various subsea electronics modules, both internally in an installation and between Xmas trees, manifolds and processing equipment. As such, the topology of many subsea networks is evolving to allow nodes in the network to form connections in an ad hoc-like manner in a mesh or partial mesh topology. In forming these mesh networks, the nodes 100a, 100b, 100c are configured to cooperate in the relaying and routing of packet data therebetween to distribute data in the network. In this way, the network resilience and adaptability is greater.

As a result of these additional connections and more flexible subsea network architectures, the bandwidth of the data connections 12 between the nodes in the subsea network 11 is considerably greater than that of the spare, non-operation critical bandwidth of the umbilical 13 that connects the subsea network 11 to the top side network 14. Further, the equivalent cost of providing and carrying extra data transfer capacity in the subsea network 11 is significantly less than increasing the data transfer capacity of the umbilical.

Figure 2:
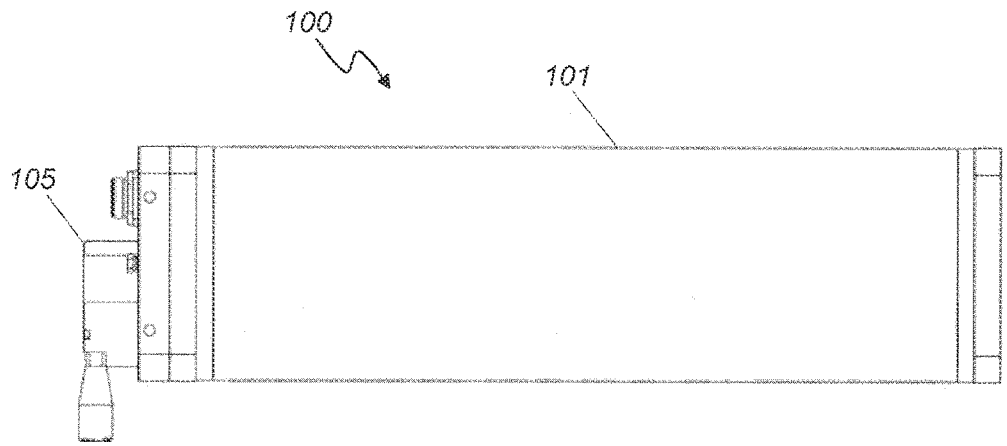
FIG. 2 shows a subsea electronics module in accordance with an embodiment of the invention for use in the system of FIG. 1 to provide the mass subsea data store.
Figure 3:
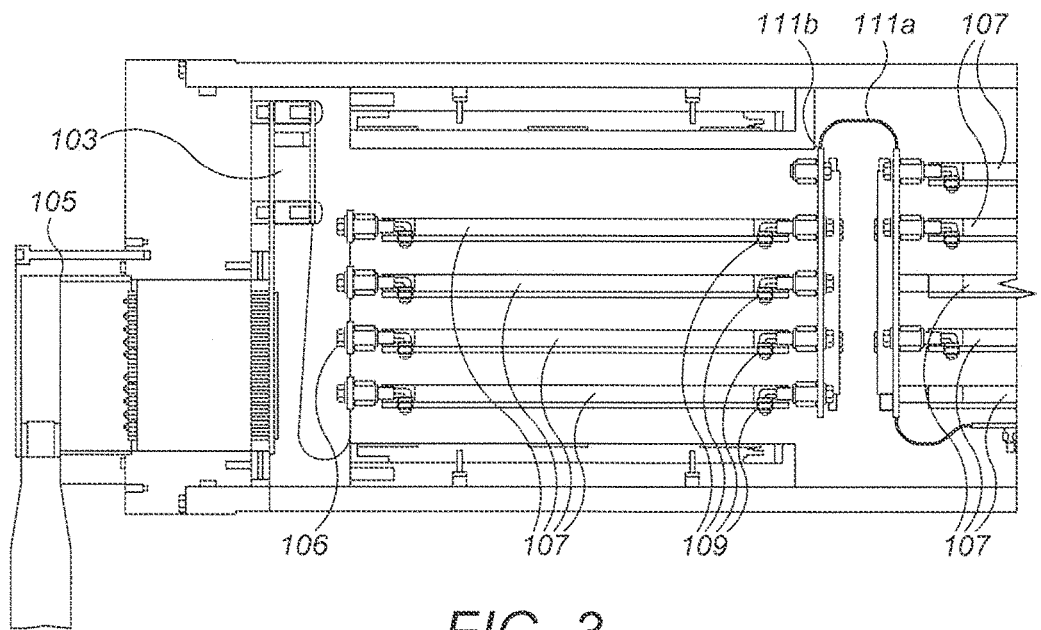
FIG. 3 shows a cross-section showing the inside of the subsea electronics module shown in FIG. 2.

Referring now to FIGS. 2 and 3, these show subsea electronics modules 100 that provide nodes 100a, 100b, 100c in a subsea network 11 for interfacing data transactions with well equipment. The subsea electronics modules 100 have a generally tubular casing 101 provided around a chassis 103 and an input port 105 at an end of the tubular casing 101 for connection to a subsea control module (SCM) (not shown) mounted on a Christmas tree at the head of a subsea well. Inside the casing 101, a series of physical cards 107 are mounted to the chassis 103 and are connected to slots 109 of a backplane 111.

Figure 4:
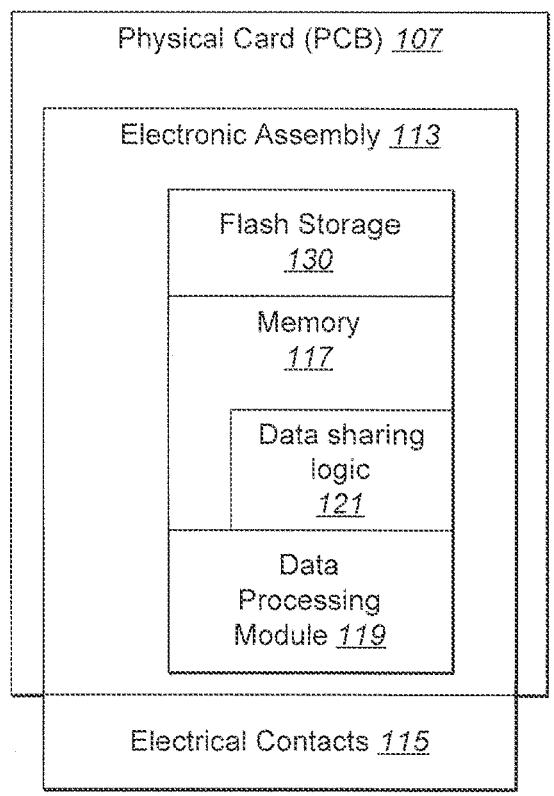
FIG. 4 schematically represents a physical card or PCB provided in the subsea electronics module of FIGS. 2 and 3 being provided with additional mass storage to support the mass subsea data store of the system shown in FIG. 1.

Referring now also to FIG. 4, the physical cards 107 support electronic assemblies 113 thereon and are provided as printed circuit boards (PCBs) having electrical contacts 115 at an edge thereof for contacting with electrical contacts of the backplane 111 arranged in a slot 109. The backplane 111 provides an electronic bus connecting the electronic assemblies provided on the physical cards 107 to each other to allow communication of electronic signals therethrough and to process data from and to provide control signals to the well equipment when connected to the SCM in use.

The backplane 111 has a flexi-rigid construction of flexible sections formed by ribbon cables 111a and rigid sections formed as printed circuit boards 111b. The backplane 111 may be provided in one or more parts.

Referring now to FIG. 4, in the embodiment, all the physical cards 107 in the SEM have identical electronic assemblies provided thereon and as such, only one generic card type is provided. In the generic physical card types of the embodiment, however, the identical electronic assemblies 113 are configurable in use to perform one of a set of defined card roles, for which each card role the generic physical card 107 performs a defined set of electronic functions so as to interface with well apparatus of a given type or types from given a manufacturer or manufacturers. With the present invention, SEMs having a full range of functional specifications may be designed and provided for interfacing with a range of combinations of different well equipment using only one, or perhaps only two generic card types.

Each electronic assembly is provided with a memory 117, which may be for example, a non-volatile memory such as a EEPROM, for storing program instructions thereon, and a data processing module 119, which may be, for example, a field programmable gate array (FPGA), capable of carrying out program instructions stored on memory 117.

With the sixth generation of subsea electronics modules having the above construction and mode of operation in which there is a higher degree of uniformity and interoperability between the different electronics modules and their modes of operation, there is now a quite tight coupling between the various cards in a node, sharing common parts of their software images, having a single Configuration Database (CDB) for the node etc. However, each node a subsea network is still to a large degree separate from other nodes with respect to file handling (software, logged data, and so on), with no sharing of resources across nodes. Up until now, separate subsea electronics modules providing separate nodes in a subsea network have had little to no integration or co-operation.

However, the present invention is in part predicated on a recognition by the inventors that the increased data transfer capacity of subsea networks 11 achieved in particular by these additional wired connections 12 now allows more co-operation and co-ordination between the nodes in the subsea network 11.

In addition, the storage capacity provided by memory or other storage provided at subsea electronics modules has until now only been sufficient for the subsea electronics module to be able to perform its specified operational function for processing and transferring operational well sensor uplink data up the umbilical 14 top side and following logic and control processing top side receiving control data back down the umbilical 14 for controlling the well control equipment. However, the present invention also harnesses another current market or technological development which is that, predominantly due to the economies of scale brought by the smartphone market, mass storage, such as flash storage is rapidly becoming available in cheap, high-capacity solutions. In embodiments, the nodes of the subsea network 11 that (individually or) together provide the mass subsea data store 104 are enabled to provide a significant storage capacity by adding a larger storage than really needed to a subsea electronic module (or, specifically, a card 107 thereof) in the form of a cheap flash storage 130 component. Usually this addition requires no hardware modifications (the interface between the data processing module 119 and flash storage 130 is pin-compatible almost regardless of size), and requires little to no additional power when not in use. This provision of additional storage capacity at the subsea electronics module nodes 100 by flash storage 130 beyond the operational requirements of the subsea electronics modules allows the subsea electronics modules to store excess data, such as non-operation critical data.

Thus in the invention, the subsea electronics modules 100a, 100b and 100c are each provided with additional mass storage 130 in excess of their operational requirements, and are configured by program instructions in the form a data sharing logic 121 stored in memory 117 of a card 107 thereof to take advantage of the increased data transfer capacity in the subsea network to interoperate with each other to effectively co-operate together to provide the mass subsea data store 104.

The mass subsea data store 104 is a distributed data store across flash storage 130 provided by plural co-operating subsea electronics modules 100a, 100b, 100c. The data sharing logic 121 further configures each subsea electronics module 100a, 100b, 100c to store data in the mass subsea data store 104 in a replicated fashion across more than one of the subsea electronics modules 100a, 100b, 100c. The nodes in the network providing the mass subsea data store are connected as peer nodes in a mesh network, meaning that each node contributes to the management of the storage and routing of the data across the mass subsea data store 104.

In order to serve requests for data stored in the mass subsea data store 104 received from other subsea nodes (e.g. other SEMs) or equipment, or from nodes in the topside network 14 received via umbilical 13, the nodes 100a, 100b, 100c are further configured by data sharing logic 121 to act as a subsea data server that, on receiving a request for access to data stored in the mass subsea data store 104, retrieve the requested data from the data store and cause the requested data to be sent over the subsea network to the intended recipient. The intended recipient may be the requestor, or the requestor may request that the data is sent to another node of the subsea network 11.

To allow the subsea electronics modules 100a, 100b, 100c to provide the distributed mass subsea file store 104, the nodes are enabled to store arbitrary files in flash storage 130, and to make them available as needed.

We will now demonstrate how the subsea data sharing system 100 can be used to facilitate the transfer of data from subsea to top side, and vice versa.

Firstly, the nodes 100a, 100b, 100c are configured such that together they store data in mass subsea data store 104 provided across the nodes. The nodes 100a, 100b, 100c are also configured to function as a subsea data server (in other embodiments, only one of nodes 100a, 100b, 100c or even a different node entirely may be configured to function as a subsea data server).

On receiving, at the subsea data server, a request for access to data stored in the mass subsea data store 104, the subsea data server retrieves the requested data from the data store and causes the requested data to be sent over the subsea network to the intended recipient. The nodes 100a, 100b, 100c configured to act as the subsea data server handle and serve requests in accordance with the hypertext transfer protocol.

The data may be received at the subsea data server nodes from the control centre 15 located top side via umbilical 13, in which case the data may be a software update for plural identical control or sensor equipment. The data sharing system 100 allows the software update to be copied across all the subsea electronics modules in the field, allowing them each to be updated with a single file transfer over the umbilical. This central data source may then be used to upgrade all of the equipment (including non-SEM equipment) in the field. This is contrasted with the prior art, where multiple copies of the same software needed to be sent down the umbilical 13 routed to each equipment individually. In this way, in the invention, a significant volume of data transfer can be saved by providing the mass subsea data store 104 which can provide access to the data to other equipment via the subsea network 11.

Another advantage of the present invention is that the file transfer support in the systems to the SEMs is much more robust to long transfer times than most regular control equipment. This allows a transfer from topside to the SEM to take hours or days (using whatever low-priority bandwidth is free on the umbilical), and then the result could be read in seconds by the equipment needing it. Thus low priority bandwidth can be used to reliably transfer data subsea over a longer period of time, where it can be distributed quickly by the subsea data sharing system. This is instead of having to interrupt the transfer of operational sensor and control data on the umbilical 13, which can be disruptive to the operation of the well.

Another way in which the mass subsea data store 104 is used is to store sensor and monitoring data generated by well sensing and monitoring equipment. A large amount of data is generated by this equipment that is not normally retrieved as only operation-critical data is sent via the umbilical 13 to the control centre 15 via topside network 14 which performs data processing and logic solving to generate control signals that are sent back via umbilical 13 to control the well control equipment. Any non-operation critical data generated subsea is normally discarded subsea and so this potentially valuable data for well characterisation is lost. However, by storing this data in the mass subsea data store 104, a buffer thereof can be generated and low priority data transfer using extra capacity in the umbilical 13 can be used to transfer this data top side to control centre 15 allowing a more detailed analysis of the wells in the field. However, the rate of generation of process and non-operations critical data subsea may exceed the unused non-operations critical bandwidth of the umbilical 13. In this case, the mass subsea data store 104 can be used to locally store this data subsea.

To retrieve the data, a bulk data transfer by physically moving memory storing the data from subsea to top side can be used. This can be achieved by using an ROV 200 to retrieve a releasable subsea memory store (such as a flash memory) having data stored thereon transferred from the mass subsea data store 104 and/or by releasing a memory store housed in a buoyant housing. The ROV 200 or the buoyant housing can be used to periodically bring the memory carrying the stored data top side where it can be collected and analysed, for example at control centre 15. Similarly, an ROV 200 may be used to transfer to the mass subsea memory store 104 larger files that cannot easily be transferred over the umbilical (e.g. if on-line bandwidth is not available) such as new software, large configuration datasets for complex instruments, etc. In this case, the ROV 200 would be operated to bring a memory store from top side to subsea and to perform a bulk data transfer into the mass subsea memory store 104.

The mechanism to transfer data between the ROV storage and the mass subsea data store 104 could be a traditional wet mate connector, wireless data transfer protocol (e.g. WLAN/

IEEE 802.11), free space optical communication, acoustic link or similar. Alternatively, the ROV could remove and carry a physical retrievable (and replaceable) mass storage device (not shown) from a node 100 that is carrying data transferred from the mass subsea memory store 104. Alternatively, instead of the ROV carrying the retrievable mass storage device from subsea to top side, the mass storage device can be arranged in a buoyant housing. A set of these buoyant mass storage devices can be provided at one or more of the nodes 100. Periodically, data can be transferred to the retrievable mass storage device from the subsea mass data store 104 and the buoyant housing can be released (e.g. by releasing a latching mechanism) and allowing the mass storage device to float top side. Each of the plurality of said buoyant mass storage devices further comprises a tracking device (e.g. a beacon or GPS system) for locating and retrieving the dispensed mass storage after flotation top side. The data stored on the retrievable physical mass storage device could be encrypted to ensure security, and the data transferred thereon could be retained in the mass subsea data store 104 until safe receipt of the device top side has been confirmed.

Although in the embodiment described in detail herein, subsea electronics modules 100a, 100b, 100c arranged at the Xmas trees of subsea wells together provide the mass subsea data store and subsea server, other equipment providing nodes in the subsea network arranged in other subsea installations can also provide this functionality in the subsea data sharing system. For example, SEMs, SCMs and other equipment at any subsea installation including at subsea wells, subsea pump systems, subsea compression systems, subsea structures or similar or can provide the functionality.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the scope of the present invention as defined by the appended claims.

The invention claimed is:

1. A method of sharing data in a subsea network comprising a plurality of nodes interconnected by a plurality of data connections arranged to carry data to and from equipment in subsea installations, the method comprising:
    storing data in a mass subsea data store provided across a plurality of nodes in the subsea network configured to act as a subsea data server; and
    on receiving, at any node of the subsea data server, a request for access to data stored in the mass subsea data store provided across the plurality of nodes, the subsea data server retrieving the requested data from the data store and causing the requested data to be sent over the subsea network to the intended recipient;
    wherein the plurality of nodes in the subsea network providing the mass subsea data store are subsea electronics modules for use in a subsea installation; and
    wherein the mass subsea data store is a distributed data store across mass storage provided by plural co-operating subsea electronics modules.

2. A method as claimed in claim 1 wherein data in the mass subsea data store is stored in a replicated fashion across more than one of the subsea electronics modules.

3. A method as claimed claim 1, wherein the nodes in the network providing the mass subsea data store are connected as peer nodes in a mesh network.

4. A method as claimed in claim 1, wherein the nodes configured to act as the subsea data server are configured to handle and serve requests in accordance with the hypertext transfer protocol.

5. A method as claimed in claim 1, further comprising receiving data from top side via a data transfer subsea from a mass storage device of a remotely operated vehicle (ROV) and storing it in the mass subsea data store.

6. A method as claimed in claim 5, further comprising making data received via the umbilical and stored in the mass subsea data store available to other nodes in the network and network accessible subsea equipment, and serving requests at the subsea data server therefrom for access to the stored data received via the umbilical.

7. A method as claimed in claim 1, further comprising:
    storing, at the mass subsea data store, data generated by subsea equipment; and
    transferring at least some of the data generated by the subsea equipment stored in the mass subsea data store top side by one or both of:
        sending the data over the umbilical as low-priority network traffic using available umbilical bandwidth;
        performing a bulk data transfer by moving a mass storage device containing the data from subsea to top side.

8. A method as claimed in claim 7, wherein performing a bulk data transfer by moving a mass storage device containing the data from subsea to top side comprises:
    transferring the data subsea to a mass storage device on a remotely operated vehicle (ROV); and
    bringing the data top side using the remotely operated vehicle.

9. A method as claimed in claim 8, wherein transferring the data subsea to a mass storage device on a remotely operated vehicle (ROV) comprises one or more of:
    using a wet mateable connector to provide a wired connection between the subsea network and the mass storage device on a remotely operated vehicle (ROV);
    wirelessly communicating the data between the subsea network and the ROV using a wireless networking protocol;
    using free space optical communication;
    using an acoustic link.

10. A method as claimed in claim 7, wherein performing a bulk data transfer by moving a mass storage device containing the data from subsea to top side comprises:
    transferring the data subsea to a mass storage device arranged in a buoyant housing;
    releasing the buoyant housing and allowing the mass storage device to float top side.

* * * * *